UNITED STATES PATENT OFFICE.

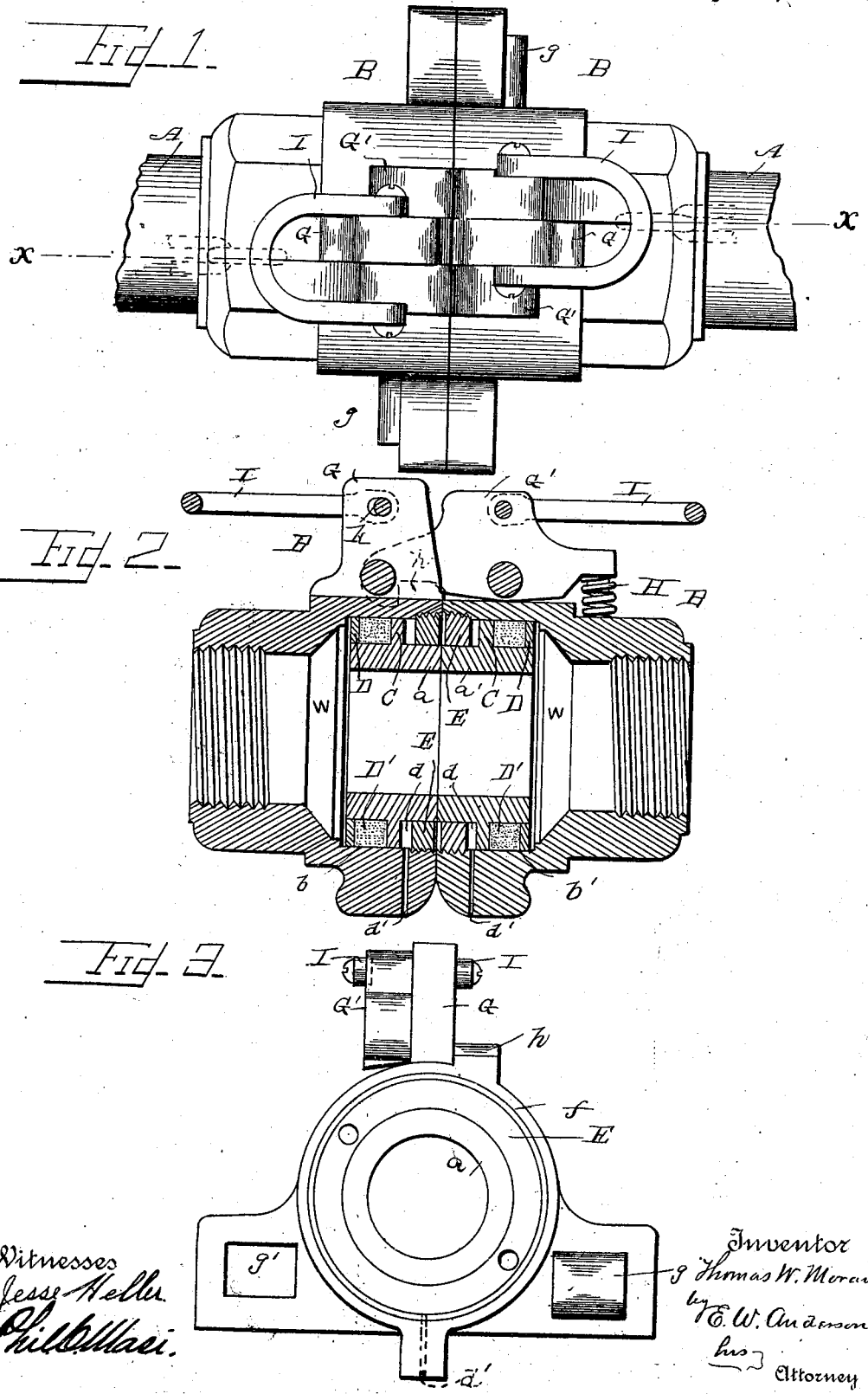

THOMAS WILLIAM MORAN, OF LOUISVILLE, KENTUCKY, ASSIGNOR TO THE MORAN FLEXIBLE STEAM JOINT COMPANY, OF SAME PLACE.

PIPE-COUPLING.

SPECIFICATION forming part of Letters Patent No. 502,234, dated July 25, 1893.

Application filed November 26, 1892. Serial No. 453,244. (No model.) Patented in England January 4, 1892, No. 151; in France January 14, 1892, No. 218,675; in Belgium January 14, 1892, No. 97,925, and in Germany January 14, 1892, No. 65,277.

*To all whom it may concern:*

Be it known that I, THOMAS WILLIAM MORAN, a citizen of the United States, and a resident of Louisville, in the county of Jefferson and State of Kentucky, have invented certain new and useful Improvements in Pipe-Couplings, (for which I have obtained patents as follows: in Great Britain, No. 151, dated January 4, 1892; in France, No. 218,675, dated January 14, 1892; in Belgium, No. 97,925, dated January 14, 1892, and in Germany, No. 65,277, dated January 14, 1892;) and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a plan view. Fig. 2 is a vertical longitudinal section on line $x\, x$ Fig. 1. Fig. 3 is a face view of one of the joints.

This invention has relation to certain improvements in pipe or hose couplings, especially adapted for steam heating pipes of railway cars, and it consists in the novel construction and combination of parts as hereinafter specified.

In carrying out the invention, I provide each hose or pipe section A, A, with one half of a piston joint B, which consists of the meeting hollow cylindric portions or pistons $a$, $a'$, held in cylindric chambers or boxes $b$, $b'$ of the casings C. These pistons $a$, $a'$ are of less diameter than the said chambers in which they are held, and are provided each with an external circular flange $c$. In the inner portions of the boxes or chambers $b$, $b'$ is an annular ring D, arranged to move therein, and between this and the ring flange $c$ of the piston is held an annular packing ring D'. The outer portions of the pistons turn each in a ring E, having a screw-threaded connection with the walls of the box or chamber, and between the under surface of this ring and the under surface of the flange $c$ is an annular chamber $d$.

When pressure is admitted to the pipes the movable rings D are forced against the packing rings, which are in turn forced against the ring flanges of the piston, causing said pistons to contact with each other to form a tight joint. It is preferred that the packing ring D' shall be of material capable of compression, for the reason that when under pressure it will form a better joint with the box than would a rigid metallic ring.

The passage through the casing is enlarged in each section at W, in order to allow the pressure to act upon the rings D.

The packing rings D' form a yielding bearing for the movable rings D, and also form a close movable joint with the casing.

The walls of the chambers or boxes $b$, $b'$ terminate at their outer ends in broad rings $f$, which allow the casings to come in close contact. The pistons may have both ends ground to form tight joints, and be used reversibly, or end for end.

The drain openings or apertures $d$ permit the escape of air, or any water of condensation which may have collected in the chambers $d'$, thereby preventing resistance to the movements of the pistons at this point, which might be caused by the confined air or water in said chambers, were said openings or apertures not present. The ends of these casings, at their lower portions, are provided with opposite interlocking lugs or hooks $g$ and eyes $g'$, which hold said casings together. On the upper portion of each casing is provided a lug or projection G, to which is pivoted a latch or catch G', the forward end of which engages a lug $h$ on the opposing casing. The opposite ends of these latches bear against a spring H, which is seated in or on the casing. When the parts come in contact these latches lock automatically and are held from disengagement by the springs H. To the top of each of these latches is secured a clevis ring or link I, the pin of which passes through an oblong slot $k$ in the lugs G, limiting the throw of the latch and protecting the spring from too great compression. To each of these clevises or links is connected one end of a slack chain, or other suitable medium, the opposite end of which may be united to the vertical portion of the hose or pipe sections, or to other suitable parts. When the cars are uncoupled, the slack of these chains will be taken up, tripping the latches, and effecting their disengagement with the lugs or projections h of the opposite casing. This will permit the casings to fall away from each other, and cause the disengagement of the interlocking hooks and eyes.

Having described this invention, what I claim as new, and desire to secure by Letters Patent, is—

1. The herein described pipe coupling, comprising the opposing casings having the cylindric chambers or boxes therein, the cylindric hollow piston sections telescoping said chambers or boxes, and having each a surrounding annular flange, the facing rings E surrounding the outer portions of said piston sections and having a threaded connection with the walls of said chambers or boxes, the chambers d between said rings E and the flanges on the piston sections, the drain openings leading outwardly from said chambers through the walls of the casings, the movable rings D at the inner portions of said boxes or chambers, and the packing rings D' between said movable rings and the flanges on the piston sections, substantially as specified.

2. In a pipe coupling, the combination with the opposing casings, having the boxes or chambers therein, the hollow sliding piston sections working in said chambers or boxes, their annular flanges, the rings E, the movable rings D, and the packing rings D', of the opposite interlocking hooks and eyes $g, g'$, on the lower meeting faces of said casings, the lug or projection G on the upper portion of each of said casings, the latches G' pivoted to said lugs or projections, the engaging lugs or projections h, and the springs H, substantially as specified.

3. In a pipe coupling, the combination with the opposing casings, and the interlocking opposite hooks $g$ and eyes $g'$, on the meeting faces of said casings, of the lugs or projections G on the upper portions of said casings, the latches or catches G' pivoted to said lugs or projections, the springs seated under the rear arms of said latches or catches, the lugs h for engagement with said latches or catches, and the clevis rings or links secured one to each of said lugs or projections G by a movable pin, substantially as specified.

In testimony whereof I affix my signature in presence of two witnesses.

THOMAS WILLIAM MORAN.

Witnesses:
C. Q. MARTIN,
ORTON T. MORAN.